United States Patent

[11] 3,535,994

[72] Inventors Dieter Maas
Munich, and
Richard Schmierl, Unterhaching near
Munich, Germany
[21] Appl. No. 710,879
[22] Filed March 6, 1968
[45] Patented Oct. 27, 1970
[73] Assignee Agfa-Gevaert Aktiengesellschaft
Heverkusen, Germany
[32] Priority March 11, 1967
[33] Germany
[31] A 27,344

[54] WINDING MECHANISM FOR SPRING MOTORS OF PHOTOGRAPHIC CAMERAS
13 Claims, 2 Drawing Figs.
[52] U.S. Cl. .................................................... 95/31
[51] Int. Cl. ................................................ G03b 19/04
[50] Field of Search ............................................. 95/31;
242/71, 71.4, 71.5

[56] References Cited
UNITED STATES PATENTS
2,655,847 10/1953 Harvey .......................... 242/71.4
2,704,969 3/1955 Mische .......................... 95/31
2,940,682 6/1960 Steineck ........................ 95/31X
3,036,507 5/1962 Lossey .......................... 95/31
3,185,058 5/1965 Singer .......................... 95/31X Primary Examiner—John M. Horan
Assistant Examiner—David S. Stallard
Attorney—Michael S. Striker ABSTRACT: A photographic camera wherein the film transporting mechanism and/or other movable mechanisms receive motion from the output member of a spring motor when the latter's spring dissipates energy. The spring is wound to store energy in response to rotation of a winding member which resembles a cylinder and is rotatably mounted on the housing so as to surround the lens mount. The winding member can wind the spring of the motor by way of a first one-way clutch and the spring can drive the output member by way of a second one-way clutch. The first clutch winds the spring only when the winding member rotates in a predetermined direction, and the second clutch rotates the output member only when the spring dissipates energy.

Patented Oct. 27, 1970

3,535,994

INVENTOR.
DIETER MAAS
RICHARD SCHMIERL

BY Michael S. Strike,
Attorney

WINDING MECHANISM FOR SPRING MOTORS OF PHOTOGRAPHIC CAMERAS

BACKGROUND OF THE INVENTION

The present invention relates to cameras, and more particularly to improvements in winding mechanisms for spring motors in still cameras or motion picture cameras.

Many cameras are provided with spring motors whose springs must be wound to store energy and to thereupon operate various mechanisms, such as the film transporting mechanism, the shutter mechanism, an indexible socket for flash bulbs and/or others. In certain types of such cameras, the spring motor is accommodated in the housing and the winding knob is mounted externally on the housing. If the user wishes to wind the motor spring in a single continuous operation, he or she must exert a considerable force and the knob must be rather large to insure a firm grasp by the fingers. The carrying case of such a camera must be provided with a separate recess to accommodate the knob.

SUMMARY OF THE INVENTION

It is an object of our invention to provide a novel and improved winding mechanism for spring motors of photographic cameras and to construct the winding mechanism in such a way that it occupies little room, that it comprises a relatively small number of simple parts, that it does not comprise any parts which project well beyond the housing of the camera and that it can be used for winding of spring motors utilizing so-called negator springs.

Another object of the invention is to provide a novel motion transmitting connection between the winding member and the spring motor in a still camera or motion picture camera.

Our invention is embodied in a photographic camera which comprises a housing, a mount for an objective lens system supported by the housing, a spring motor mounted in the housing and having a rotary output member which is arranged to operate at least one movable mechanism of the camera (for example, the film transporting means, the shutter and/or socket for a multiple flash bulb holder) when the motor spring dissipates energy, and winding means serving to cause the motor spring to store energy. The winding means comprises an annular or tubular winding member which is rotatably supported by the housing and is coaxial with and preferably surrounds at least a portion of the lens mount.

The spring motor may comprise a so-called negator spring one end of which is anchored in a rotary core which is coupled with and rotates the output member when caused to rotate in a first direction while the spring of the motor dissipates energy. The core rotates in a second direction to convolute the spring around its periphery and to thus cause the spring to store energy when the winding member is rotated by hand in a predetermined direction. The motion transmitting connection between the winding member and the core may comprise an internal gear on the winding member, a pinion rotatably mounted in the lens mount and meshing with the internal gear, a spring friction clutch or another suitable one-way clutch which transmits torque when the pinion rotates with the winding member in predetermined direction, a coupling which is driven by the clutch, and a set of bevel gears which receive motion from the coupling and rotate the core in the second direction.

The novel features which are considered as characteristic of the invention are set forth in particular in the appended claims. The improved winding mechanism itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
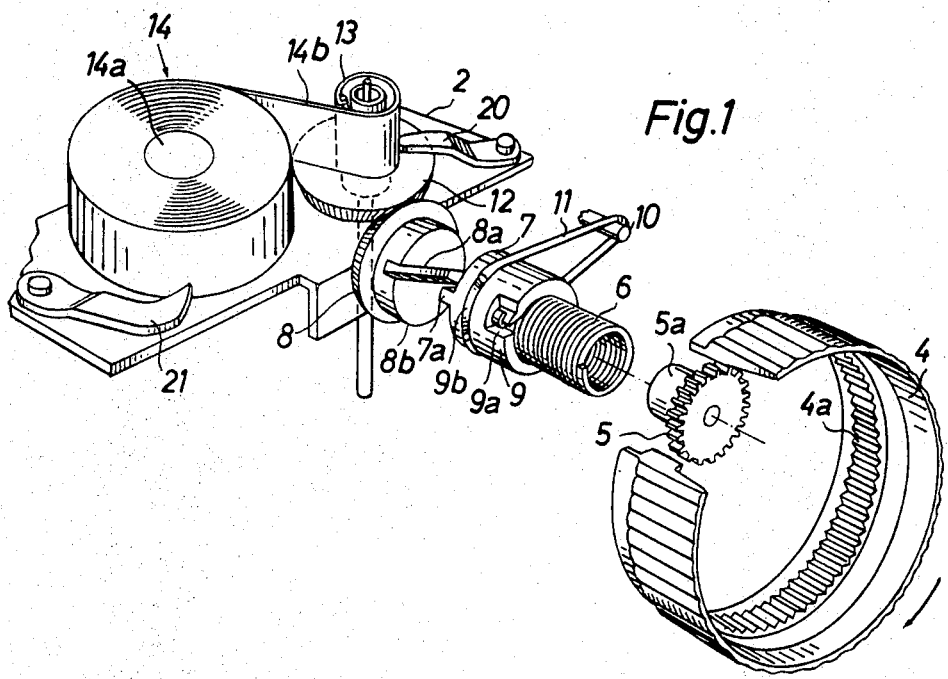
FIG. 1 is a fragmentary exploded perspective view of a still camera which embodies the winding mechanism of our invention.

Referring to the drawing, there is shown a portion of a still camera which comprises a housing 1 having a horizontal internal wall or partition 2 and a front wall 1A connected with a lens mount 3 for an objective lens system OL. The winding means for the spring motor 14 comprises a tubular winding member 4 which is rotatable around and is coaxial with the lens mount 3. The winding member 4 (hereinafter called cylinder for short) has an annular internal gear 4a meshing with a pinion 5 which is journaled in the lens mount 3. The pinion 5 is rigid with a coaxial stub 5a which forms part of a first one-way spring friction clutch. The latter further comprises a helical spring 6 a portion of which receives the stub 5a with a tight fit. The clutch also includes a second stub 7 which extends into the other portion of the helical spring 6 and whose diameter is somewhat smaller than that of the stub 5a so that it is a loose fit in the spring. The stub 5a has an end face which abuts against the adjoining end face of the stub 7. The stub 7 has an extension 7a of other than circular outline which is received in a complementary slot 8a provided in a socket 8b forming an integral part of a bevel gear 8. In the illustrated embodiment, the extension 7a resembles a diametrically extending rib. The parts 8a, 8b, 7a form a simple coupling which connects the aforementioned spring friction clutch 5a, 6, 7 with the bevel gear 8. The stub 7 is received in a loosely mounted sleeve 9 having a recess or cutout 9a for one end of the spring 6. The sleeve 9 forms part of a braking device and is provided with a circumferential groove 9b for an endless braking spring 11 which is also trained around a stationary post or stud 10. The stub 5a is rotatable on a shaft 15 which is installed in an axially parallel bore 3a of the lens mount 3. A similar shaft 16 for the bevel gear 8 is mounted on a downwardly bent front portion of the partition 2.

The bevel gear 8 meshes with a bevel gear 12 which is installed at a level above the partition 2 and is rigid or integral with the core 13 of the spring motor 14. The core 13 is of U-shaped axial sectional outline and has a centrally located hollow cylindrical stub 13a which forms part of a second one-way spring friction clutch. The stub 13a is traversed by a coaxial output shaft 17 which is journaled in the partition 2 and carries at its lower end a gear 19a forming part of a gear train 19 which can transmit motion to several components of the camera, for example to one or more sprockets 25 of the film transporting mechanism, to a winding mechanism for the shutter, to an indexible socket for flash bulbs, and/or others. One end portion of the motor spring 14b is anchored in the core 13 (see FIG. 1). The aforementioned stub 13a does not extend all the way to the top of the core 13 and is coaxial with a second stub 17a which is rigid with the output shaft 17. The second friction clutch further comprises a helical spring 18 which surrounds the stubs 13a, 17a in such a way that the stub 13a is a tight fit but that the stub 17a is a loose fit (see FIG. 2). Thus, the diameter of the stub 17a is somewhat less than that of the stub 13a. The other end of the motor spring 14b is affixed to a post 14a. The spring 14b constitutes a so-called negator spring; it tends to coil itself around the post 14a.

In order to wind the spring 14b, the user of the camera rotates the cylinder 4 in a clockwise direction, as viewed in FIG. 1. The pinion 5 rotates in the same direction. Since the stub 5a is a tight fit in the spring 6, the latter tends to rotate in the clockwise direction but such rotation of the spring 6 is opposed by the braking device 9, 10, 11 whereby the spring 6 contracts and engages the peripheral surface of the stub 7. The spring 6 then begins to rotate the stub 7 and the sleeve 9 whereby the rib 7a of the stub 7 drives the socket 8b and the bevel gear 8 in a clockwise direction, as viewed in FIG. 1. The gear 8 drives the bevel gear 12 in a counter clockwise direction whereby the core 13 collects the windings of the spring 14b by drawing the spring off the post 14a. The spring 14b stores energy and tends to coil itself back onto the post 14a. When the core 13 rotates in a counterclockwise direction to collect the windings of the spring 14b, the diameter of the helical clutch spring 18 increases so that the latter cannot rotate the stub 17a on the output shaft 17, i.e., the gear train 19 and the output shaft 17 do not share rotational movement of the core 13 and gear 12 in a counterclockwise direction.

If the user wishes, he or she can rotate the cylinder 4 back and forth. Such mode of winding is often preferred. The cylinder 4 rotates the pinion 5 back and forth but the spring 6 causes the bevel gear 8 to turn only when the cylinder 4 rotates in a clockwise direction. This is due to the fact that, when the pinion 5 rotates the stub 5a in a counterclockwise direction, the diameter of the clutch spring 6 tends to increase and the spring 6 cannot transmit torque to the stub 7.

When the spring 14b is permitted to dissipate energy by winding itself back onto the post 14a, the core 13 rotates in a clockwise direction and causes the clutch spring 18 to contract around the stub 17a of the output shaft 17 so that the latter rotates in the clockwise direction and drives the gear 19a of the gear train 19. The bevel gear 12 rotates in a clockwise direction and drives the gear 8 and socket 8b in a counterclockwise direction. The socket 8b drives the stub 7 in a counterclockwise direction and, since the stub 7 is a loose fit in the clutch spring 6, the latter cannot drive the stub 5a and pinion 5 in such counterclockwise direction. Thus, the cylinder 4 remains idle when the spring 14b dissipates energy.

The numerals 20 and 21 denote schematically illustrated stops which arrest the spring 14b in its respective end positions. The manner in which such stops cooperate with the spring 14b is known. The camera further comprises suitable pawls or the like which determine the extent to which the output shaft 17 is allowed to turn when the spring 14b is free to dissipate energy. Such pawls can be controlled in a manner well known from the art of spring motors employing negator springs.

In order to insure proper centering of the cylinder 4, the front wall 1A of the housing 1 is provided with a ring-shaped bearing member 1a having an annular internal surface 1b which surrounds the rear end portion of the cylinder. The pinion 5 is held in requisite position by the aforementioned shaft 15 in the axially parallel bore 3a of the lens mount 3. The lens mount 3 is properly centered on and is preferably threadedly connected with the front wall 1A.

Figure 2:
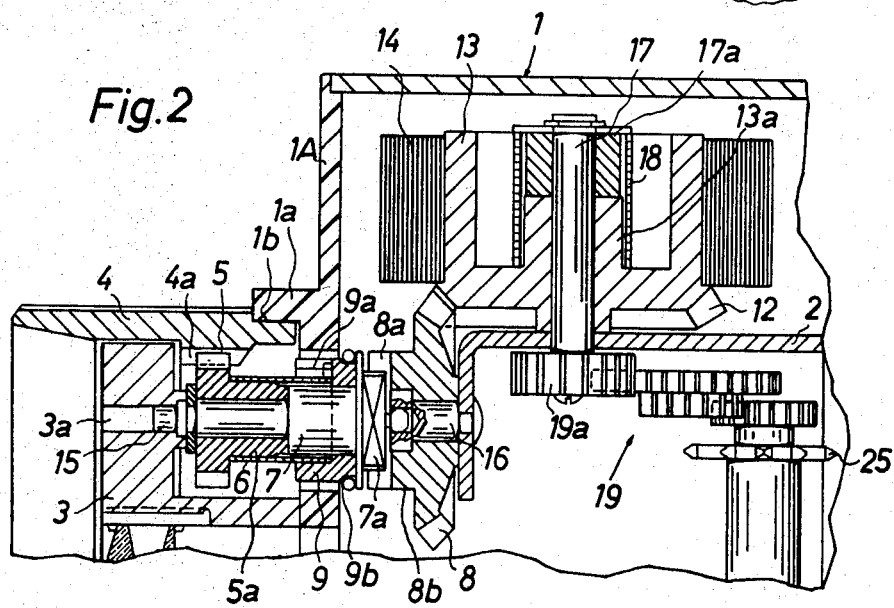
FIG. 2 is a larger scale fragmentary transverse vertical sectional view of the camera.

The camera of FIGS. 1 and 2 can be modified in a number of ways without departing from the spriit of the present invention. For example, the stub 7 can be made integral with the bevel gear 8. Furthermore, the negator spring 14b can be replaced by a different spring and at least one of the spring friction clutches including the springs 6 and 18 can be replaced by a different one-way clutch. Still further, the bearing 1a on the front wall 1A can be provided with a circular groove for the rear end portion of the cylinder 4.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

We claim:

1. In a photographic camera, a housing; a spring motor supported by said housing, said motor including a spring and a movable output member; a camera mechanism including a movable portion arranged to receive motion from said output member when the spring dissipates energy; a lens mount on said housing; and winding means for said spring, said winding means including a rotary tubular winding member supported by said housing and coaxial with and at least partially surrounding said lens mount.

2. A structure as defined in claim 1, wherein said motor is received in said housing.

3. A structure as defined in claim 1, wherein said motor further comprises a portion which rotates with said output member in a first direction when the spring dissipates energy and in a second direction when the spring stores energy in response to rotation of said winding member in a predetermined direction, said winding member comprising a first gear and said winding means further comprising a second gear meshing with said first gear and a motion transmitting connection between said second gear and said portion of said motor for rotating said portion in said direction in response to rotation of said first gear in said predetermined direction.

4. A structure as defined in claim 1, wherein said output member is rotatable about an axis which is inclined with reference to the axis of said winding member and wherein said spring dissipates energy at a substantially constant rate during unwinding, said motor further including a rotary core connected with one end of said spring and said core being arranged to rotate said output member in a first direction when said spring dissipates energy and to rotate with reference to said output member in a second direction when said spring stores energy in response to rotation of said winding member in a predetermined direction.

5. In a photographic camera, a housing; a spring motor supported by said housing and including a spring and a movable output member arranged to operate at least one movable mechanism of the camera when the spring dissipates energy; a lens mount on said housing; and winding means for said spring, including a rotary tubular winding member supported by said housing and coaxial with said lens mount, said motor further comprising a portion which rotates with said output member in a first direction when the spring dissipates energy and in a second direction when the spring stores energy in response to rotation of said winding member in a predetermined direction, said winding member comprising an internal gear and said winding means further comprising a pinion rotatably mounted in said lens mount and meshing with said internal gear and a motion transmitting connection between said pinion and said portion of said motor for rotating said portion in said second direction in response to rotation of said internal gear in said predetermined direction.

6. In a photographic camera, a housing; a spring motor supported by said housing and including a spring and a movable output member arranged to operate at least one movable mechanism of the camera when the spring dissipates energy; a lens mount on said housing; and winding means for said spring, including a rotary tubular winding member supported by said housing and coaxial with said lens mount, said motor further including a portion which rotates with said output member in a first direction when the spring dissipates energy and in a second direction when the spring stores energy in response to rotation of said winding member in a predetermined direction, said winding member comprising a first gear and said winding means further including a second gear meshing with said first gear and a motion transmitting connection between said second gear and said portion of said motor for rotating said portion in said second direction in response to rotation of said first gear in said predetermined direction, said motion transmitting connection comprising one-way clutch means arranged to drive said portion of said motor in said second direction in response to rotation of said winding member in said predetermined direction.

7. A structure as defined in claim 6, wherein said one-way clutch means comprises a first stub coaxial and rigid with said second gear, a second stub coaxial with and having a diameter slightly less than that of said first stub, and a helical clutch spring surrounding said stubs, said first stub being a tight fit and said second stub being a loose fit in said clutch spring and said clutch spring being arranged to frictionally engage said second stub in response to rotation of said winding member in said predetermined direction, said connection further comprising means for rotating said portion of said motor in response to rotation of said second stub.

8. A structure as defined in claim 7, further comprising braking means for said clutch spring, said braking means comprising a tubular member loosely surrounding said second stub and having anchoring means for one end of said clutch spring, and a braking spring cooperating with said tubular member to oppose rotation of said end of said clutch spring in response to rotation of said winding member in said predetermined direction.

9. In a photographic camera, a housing; a spring motor supported by said housing and including a spring and a movable output member arranged to operate at least one movable mechanism of the camera when the spring dissipates energy; a lens mount of said housing; winding means for said spring including a rotary tubular winding member supported by said housing and coaxial with said lens mount, said motor further including a portion coaxial with said output member and rotatable in a first direction when said spring dissipates energy and in a second direction to store energy in said spring in response to rotation of said winding member in a predetermined direction; and one-way clutch means for rotating said output member in response to rotation of said portion of said motor in said first direction.

10. A structure as defined in claim 9, wherein said clutch means comprises a spring friction clutch.

11. A structure as defined in claim 10, wherein said spring dissipates energy at a substantiallly constant rate during unwinding and has one end anchored in said portion of said motor, said spring being arranged to convolute itself around said portion in response to rotation of said portion in said second direction.

12. In a photographic camera, a housing; a spring motor supported by said housing and including a spring and a movable output member arranged to operate at least one movable mechanism of the camera when the spring dissipates energy; a lens mount on said housing; and winding means for said spring including a rotary tubular winding member supported by said housing and coaxial with said lens mount, said housing comprising a wall provided with a ring-shaped bearing having an internal surface surrounding an end portion of said winding member.

13. A structure as defined in claim 12, wherein said bearing is coaxial with said lens mount and wherein said lens mount is threadedly connected with said housing, said winding means further comprising an internal gear provided on said winding member, a pinion rotatably journaled in said lens mount and meshing with said internal gear, and means for winding said spring in response to rotation of said pinion when said winding member rotates in a predetermined direction.